United States Patent

Paul

[15] 3,652,856

[45] Mar. 28, 1972

[54] APPARATUS AND METHOD FOR IMAGE CONVERSION OF INFRARED RADIATION

[72] Inventor: Bernt Paul, Erlangen, Germany

[73] Assignee: Siemens Aktiengesellschaft, Berlin and Munich, Germany

[22] Filed: Mar. 18, 1970

[21] Appl. No.: 20,697

[30] Foreign Application Priority Data

Mar. 25, 1969 Germany .......................P 19 15 048.2

[52] U.S. Cl. ........................250/83.3 HP, 250/83.3 H, 350/7

[51] Int. Cl. ............................................................G01j 1/02

[58] Field of Search....................250/83.3 H, 83.3 HP; 350/7

[56] References Cited

UNITED STATES PATENTS

| | | | |
|---|---|---|---|
| 3,144,555 | 8/1964 | Aroyan et al. | 250/83.3 H |
| 3,239,674 | 3/1966 | Aroyan | 250/83.3 H X |
| 3,139,529 | 6/1964 | Stauffer | 250/83.3 H |
| 2,895,049 | 7/1959 | Astheimer et al. | 250/83.3 HP X |
| 3,408,497 | 10/1968 | Lowe | 250/83.3 H |

*Primary Examiner*—Archie R. Borchelt
*Attorney*—Curt M. Avery, Arthur E. Wilfond, Herbert L. Lerner and Daniel J. Tick

[57] ABSTRACT

A radiation detector produces a control signal in accordance with radiation impinging thereon. An optically effective modulator comprising a chopper directs radiation from a specimen section to the surface of the radiation detector in a manner whereby the surface is marked with various image points in a predetermined geometrical arrangement at various carrier frequencies. The radiation detector produces a signal which is the sum of all the image intensity pulses impressed upon the various carrier frequencies. A separator coupled to the radiation detector separates the image point pulses in accordance with their carrier frequencies. Storers coupled to the separator individually store the separated image point pulses. A scanner coupled to the storers scans the stored image point pulses in accordance with the sequence of the marked image point in order to provide a suitable control signal.

59 Claims, 7 Drawing Figures

APPARATUS AND METHOD FOR IMAGE CONVERSION OF INFRARED RADIATION

DESCRIPTION OF THE INVENTION

The invention relates to the image conversion of infrared radiation. More particularly, the invention relates to apparatus and method for image conversion of infrared radiation. In the apparatus of the invention, at least one specimen section is projected upon a radiation detector and a monitor is controlled by the signal produced by the radiation detector.

In order to operate image converters or thermographs for the long wave infrared radiation of thermal radiators of low temperature ($\lambda \geq 4$ $\mu$m.), preferably at temperatures less than 100°C, at image sequence frequencies of more than 1 Hertz, three different techniques are hereinafter discussed. These techniques are described in reference literature written by F.D. Morten and R.E.J. King in Infrared Physics 8, 9, 1968.

In one technique, a single image point detector device is utilized to register the radiation and two-dimensional beam deflection. In another technique, a detector line and one-dimensional beam deflection are utilized. In the third technique, a two-dimensional detector device such as, for example, in a raster system, without beam deflection, may be utilized. The three techniques are illustrated in FIG. 1 of the Infrared Physics article. The advantages and disadvantages of these techniques are described in the article.

The requirements for the detectors relative to the time constant and verification sensitivity decrease with an increase in the number of individual detectors if said detectors are utilized, for example, in a rectilinear or surface device for registering the beam or radiation. On the other hand, the requirements for electronic processing and therefore for the related expenses, increase. Thus, for example, only one amplifier is necessary for scanning a specimen with a single image point detector and two-dimensional beam deflection.

If a detector line and a one-dimensional beam deflection are utilized, then, in accordance with the aforedescribed article, 100 amplifiers are required for an image having $10^4$ image points and 100 lines. For a two-dimensional detector device, however, with 100 lines and 100 image points in each line, 10,000 amplifiers are required. It is thus extremely expensive to provide the electronic equipment for one detector line or one two-dimensional detector device (mosaic structure) for registering the radiation. Therefore, prior to the present invention, only infrared image converters or cameras equipped with a single image point detector element for registering the radiation, whereby the specimen is scanned with a two-dimensional beam deflection, have been available for industrial and medical uses.

The infrared image converters which are commercially available have two basic disadvantages. The first disadvantage is that the radiation output, which impinges upon the objective and carries the image information, is utilized only to a negligible fraction. At a surface dissolution of the image in $s$ lines and $t$ image points, actually only a fraction $\tau_B/st$ is utilized for the information processing of the entire image from the total exposure time $\tau_B$. For a typical dissolution of the image in $st =$ 100 times 100 image points, only the $10^{-4}$ "*of the information flow collected sequence the objective, is utilized.*

The second basic disadvantage of the commercially available infrared image converters is that the time $\tau_P$, which is available for forming a signal for a single image point, is also smaller than the time available for the total image, by a factor $1/st$. In an image sequency frequency of 25 Hertz, the aforedescribed image area dissolution yields $$\tau_P = \frac{1}{25}\,\frac{1}{(100)(100)}\,s = 4\mu s$$

This results in the required bandwidth $$\Delta f \approx 4/\tau_P = 10^6 \text{ Hertz}$$

In an infrared radiation image converter, which must produce a "continuous" image at an image sequence frequency of at least 1 Hertz, it is therefore necessary to utilize, as known instruments, a detector having an extremely high sensitivity D*, which is greater than $10^8$ cm. Hz.$^{1/2}$ W$^{-1}$, and a very small time constant $\tau$, which is less than 5 $\mu$s. These two requirements may be met simultaneously in the median and long wave infrared radiation range only by the utilization of deeply cooled radiation detectors such as, for example, InSb, or indium antimonide, photoconductors cooled by liquid nitrogen.

The aforedescribed radiation detector is utilized in the most modern infrared image converters commercially sold. Such detector, however, processes only the radiation portion at wavelengths less than 5.5 $\mu$m., due to the temperature dependent variation in the absorption limit. This means that out of the radiation output, which is utilized, anyway, only during a fraction of the exposition time, at a temperature of, for example, 40° C, only 3 percent of the integral radiation output, relating to the wavelength, will be processed.

Infrared image converters with rectilinear or even surface arrangements of the detector devices may operate with substantially slower detectors and may also be of less sensitivity with respect to the verification sensitivity of the detectors, so that even non-cooled thermal detectors may be utilized. In accordance with previous concepts disclosed in the aforedescribed article, the amplification requires a disproportionately high electronic output and leads to extreme difficulties, because the very weak signal currents of a plurality of single detectors may not be falsified by switching current pulses.

Furthermore, even a line arrangement of, for example, 100 individual detectors, would lead to extremely expensive equipment involving contacts and wiring. The requirement for mutual electrical insulation of the single or individual detectors would finally result in space or surface losses within the sensitive area. This is due to the necessary mutual spacing between the detector devices. The losses may become considerable in multi-unit detectors designed for microtechnology, as a result of which the utilized flow of information is further reduced.

The principal object of the invention is to provide a new and improved apparatus and method for the image conversion of infrared radiation.

An object of the invention is to provide apparatus and a method for the image conversion of infrared radiation, which apparatus utilizes non-cooled radiation detectors.

An object of the invention is to provide apparatus and a method for the image conversion of infrared radiation, which apparatus is of simple structure.

An object of the invention is to provide apparatus and a method for the image conversion of infrared radiation, which apparatus functions with efficiency, effectiveness and reliability.

In accordance with the invention, the radiation impinging upon the detector surface is marked at various image points with a predetermined geometrical device, via an optically effective modulator at various carrier frequencies. The radiation detector helps to provide a signal which defines an addition comprising all image point intensity pulses modulated on the various carrier frequencies. The image point pulses are separated in accordance with their carrier frequencies and are individually stored. The stored image point pulses are scanned in accordance with the sequence of marked image points in order to control the monitor.

A raster type arrangement may be selected from the marked image points. Various specimen sections may be projected in sequence upon the radiation detector. A strip-hike specimen section is preferably projected. The marked image points are rectilinearly arranged adjacent each other on the specimen section.

In the apparatus and method of the invention, the surface or rectilinear dissolution of the radiation intensity of a specimen projected upon a surface or rectilinear detector is effected by producing the image points within the area or line with the assistance of markings, at carrier or chopper frequencies. The image signals marked at these location dependent carrier frequencies may be additively mixed without the loss of information.

The individual components which correspond to the image points may be sorted again by frequency analysis. Therefore, a one-dimensional beam deflection should be provided at the most, for example, in a rectilinear specimen section. Due to the utilization of a simple surface or line detector, the requirements for verification sensitivity and response time of the radiation detector are reduced by a factor relative to the single image point detector. The factor is approximately equal, in a line detector, to the number of image points per line to be resolved. As a result, detectors which are operated in a non-cooled condition may also be utilized as receivers in rapid infrared image converters.

The utilized flow of information is magnified, since the greater fraction of the total exposure time is utilized for processing the information and the unused interspaces occurring in the detector lines or surface detector devices are eliminated within the rectilinear or surface radiation detector. All the image point signals of the surface or of a line may be simultaneously amplified in a wideband amplifier via a common channel, and are subsequently separated during frequency analysis. The frequency analysis is performed by a set of phase-controlled demodulators. The number of phase-controlled demodulators corresponds to the number of $n$ marked image points. The image point pulses therein are simultaneously separated. Thus, only one amplifier is necessary and expenditures for electronic equipment remain slight, but exceed the equipment requirements for the single image point method of conventional apparatus, only due to the necessary demodulators.

It is preferable to adjust the carrier frequency in $n$ marked image points, so that the equation for the carrier frequency of the $i^{th}$ image point is $$\nu_i = [\nu_1 + (i-1)]\nu_o$$

with $$\nu_1 = m\nu_o$$

and $i = 1, \ldots, n$ wherein $\nu_o$ is an arbitrary frequency and $m$ is a whole number which may be selected at least approximately equal to $n$ and $\nu_o$ between approximately 10 Hertz and about 1000 Hertz.

This setting of the carrier frequency results in the decrease of the band spacing from the highest chopper frequency to the lowest chopper frequency by a factor of only 2.

The phase-controlled demodulators may be controlled by phase signals produced by the optically effective modulator. The signals produced by the radiation detector may be optically split into $n$ signals and each of said signals may be delivered to a phase-controlled demodulator. In a preferred embodiment of the invention, at least one chopper is utilized to produce the carrier frequency. A rectilinear or surface radiation detector is provided which produces addible voltages in its surface elements which correspond to the marked image points. The radiation detector is connected at its output to a bandwidth amplifier. The number of phase-controlled demodulators, as well as storers or accumulators, corresponds to the number $n$ of image points.

The chopper may comprise a cylinder which is rotatably mounted for rotation about its axis. The surface of the cylinder may be divided into cylindrical components. Each cylindrical component may be subdivided along a longitudinal or peripheral line into equidistant alternately reflecting and non-reflecting regions or zones. The number of zones of each component cylinder may be even. The component cylinders may have equal altitudes or longitudinal lengths.

The chopper may comprise a circular disc rotatably mounted for rotation about its axis. The disc is divided into concentric rings or annuli. Each circular ring or annulus may be divided into equidistant alternately reflecting and non-reflecting, or transparent and absorbing, regions or zones. There may be an even number of zones in the different annuli. The difference between the radii of each annulus may be equal to that of the others.

The chopper may comprise an endless band which is clamped by two spaced pivotally mounted rollers in transmission arrangement. The band may be subdivided into longitudinal strips. Each longitudinal strip may be subdivided into equidistant alternately reflecting and non-reflecting, or transparent and absorbing, regions or zones. Each longitudinal strip may have an even number of zones. The longitudinal strips may be of equal width. Preferably, when considering the subordination $k_1 < k_2 < \ldots < k_n$, the number $k_i$ of the zone of the $i^{th}$ longitudinal strip is $$k_i = k_{i-1} + 2$$

wherein $i = 2, \ldots, nk_1$, which may be equal to $2n$. This number of zones of the $i^{th}$ longitudinal strip may also be an even-numbered multiple of $k_i$.

The average diameters $r_i$ of the annuli or rings are approximately $$r_1 : r_2 : \ldots : r_{n-1} : r_n = k_1 : k_2 : \ldots : k_{n-1} : k_n$$

At such radii, all the zones of each ring are of equal dimensions, except for the curvature. The cylinder or ring may rotate at a frequency $\nu_o$.

The radiation which penetrates a chopper of the aforedescribed type, or is reflected by the surface thereof, is divided into $n$ at variable chopper frequencies or chopper frequency modulated bunches of radiation, whereby the bunch of radiation which is admitted or reflected by the $i^{th}$ cylinder component or the $i^{th}$ ring is modulated at a chopper frequency $$\nu_i = k_{i/2}\, \nu_o$$

The subdivision into zones or regions in accordance with the aforedescribed rule, provides the best possible homogeneous distribution of the band spacings of the $n$ carrier frequencies. At $k_i = 2n$ and $k_n = 4n-2$, the band spacing of the zone sequence which is most closely subdivided and which corresponds to the highest carrier frequency, increases in comparison with the zone sequence which is most widely subdivided and which corresponds to the lowest carrier frequency, by a factor $$\frac{(\Delta v/v)_1}{(\Delta v/v)_n} = \frac{2n-1}{n} \approx 2$$

The chopper is hereinafter described as a multifrequency chopper. When it has the configuration of a cylinder, it also has the disadvantage that the division must be undertaken on a curved surface, although such surface is developable. This disadvantage is avoided when the multifrequency chopper has the configuration of a disc or an endless band.

The specimen section may be projected on at least one chopper prior to its projection on the radiation detector. At least one chopper should be transparent to the radiation impinging upon the radiation detector. The reflection at the chopper and the penetration of the chopper produce a clear spatially variable modulation of the specimen radiation. In rectilinear scanning of the specimen, the modulation of the radiation is provided by carrier frequencies and a chopper. To provide surface marking of the image section at carrier frequencies, it is preferable to utilize two choppers. The band-shaped chopper is particularly advantageous for this purpose.

The radiation detector may comprise a semiconductor body having a photoelectromagnetic effect, or PEM detector, or having a photothermomagnetic effect, or OEN detector, or a semiconductor photoresistance, or photobolometer. These semiconductor bodies may comprise indium antimonide or InSb, particularly with inclusions of good conducting material such as, for example, nickel antimonide or NiSb. The inclusions of good electrically conductive material may be needle-shaped and are preferably aligned substantially in parallel with each other and substantially in parallel with the direction of the radiation to be registered and perpendicularly to the direction of the magnetic field or the direction of flow of the electrical current.

The radiation detector may comprise a barrier layer photoelement having a barrier layer which extends parallel to the irradiated surface. The barrier layer photoelement may comprise III–V or II–VI compounds. A barrier layer photoelement of this type is best utilized in a surface radiation detector having surface markings of the image points at carrier frequencies.

A luminescence diode, especially a gallium arsenide, or GaAs luminescence diode, is preferably utilized to convert the detector voltage into an optical signal. The optical signal may be measured by $n$ light conductors and is delivered, via each light conductor, to a photoresistor of a phase-controlled demodulator, and subsequently to an integrating member serving as a storer or accumulator. The conversion of the detector voltage into an optical signal, delivered via light conductors to phase-controlled demodulators, permits the utilization of the information of all $n$ channels simultaneously and during the entire measuring period of the specimen section. This results in an optimum signal to noise ratio. A successive scanning of the channels by warbling the received frequency, without storing the image point information, as is customary in commercially sold instruments, would substantially cancel out the advantages of the surface or rectilinear radiation detector.

It is preferable to provide n optical signals by eliminating a component region of the chopper with constant light, whereby each signal is modulated on a carrier frequency. Each of these optical signals is delivered, via a light conductor, to a phase-controlled demodulator, as a phase signal. The brightness or intensity of a spot of light on an oscillograph tube may be controlled by image point pulses. A plurality of rectilinear specimen sections may be scanned at a frequency $\nu_B$ and the image deflection may be controlled on the oscillograph tube in synchronism with said frequency.

A multifrequency chopper of the aforedescribed type, especially a wafer or band-shaped multifrequency chopper, may be produced in a simple manner, conventionally utilized in the semiconductor art, by photoetching, in accordance with a pattern drawn on enlarged scale. A modification of the cutting method utilized for producing records may also be utilized.

In accordance with the invention, apparatus for the image conversion of infrared radiation comprises a radiation detector having a surface and producing a control signal in accordance with radiation impinging thereon. Projecting means for projecting at least one specimen section on the surface of said radiation detector comprises optically effective modulator means for directing radiation from the specimen section to the surface of the radiation detector in a manner whereby the surface is marked with various image points in a predetermined geometrical arrangement at various carrier frequencies. The radiation detector produces a signal which is the sum of all the image intensity pulses impressed upon the various carrier frequencies. Separating means coupled to the radiation detector separates the image point pulses in accordance with their carrier frequencies. Storage means coupled to the separating means individually stores the separated image point pulses. Scanning means coupled to the storage means scans the stored image point pulses in accordance with the sequence of the marked image point in order to provide a suitable control signal.

The marked image points are in a scanning type arrangement.

The radiation detector projects in sequence the various sections of the specimen.

The radiation detector projects in sequence the various sections of the specimen, the marked image points being adjacently arranged rectilinearly on the sections.

In $n$ marked image points, the carrier frequency $\nu_i$ of the $i^{th}$ image point is defined as $$\nu_i = \nu_1 + (i-1)\nu_o$$

wherein $\nu_1 = m\nu_o$; $i = l, \ldots n$; $\nu_o$ is an arbitrary frequency and m is a whole number. m is approximately equal to $n$ and $\nu_o$ is between approximately 10 and 1000 Hertz.

A wideband amplifier couples the radiation detector to the separating means.

The separating means simultaneously separates the image point pulses and comprises a plurality of phase controlled demodulators equal in number to the number $n$ of the marked image points. The demodulators are controlled by phase signals provided by the modulator means. Optical means is coupled between the modulator means and the separating means for optically splitting the signal produced by the radiation detector into $n$ signals and for supplying each of the signals to a corresponding one of the demodulators.

In accordance with the invention, apparatus for the image conversion of infrared radiation comprises a radiation detector having a surface. Optically effective modulator means directs radiation from a specimen section to the surface of the radiation detector in a manner whereby the surface of the radiation detector is marked with various image points in a predetermined geometrical arrangement at various carrier frequencies. The radiation detector has surface elements for producing addable voltages at the surface elements corresponding to the marked image points. The modulator means comprises a multifrequency chopper for producing the carrier frequencies. A wideband amplifier is coupled to said radiation detector. A plurality of phase-controlled demodulators equal in number to the number $n$ of the marked image points are coupled to the wideband amplifier for separating the image point pulses in accordance with their carrier frequencies. Each of a plurality of storage means is connected to a corresponding one of the demodulators for individually storing the separated image point pulses.

The chopper of the modulator means may comprise a cylinder rotatably mounted for rotation about its axis. The cylinder has a cylindrical surface subdivided into a plurality of coaxial next-adjacent component cylinders. Each of the component cylinders is further divided into equidistant alternate reflecting and non-reflecting zones. Each of the component cylinders has an even number of zones. The component cylinders are of equal lateral width. The $i^{th}$ component cylinder has a number $k_i$ of zones defined as $$k_i = k_{i-1} + 2$$

wherein $i = 2, \ldots, n$. The cylinder rotates at a frequency $\nu_o$. $k_1$ is approximately equal to $2n$.

The chopper of the modulator means may comprise a disc having a surface divided into a plurality of concentric annuli. Each of the annuli is subdivided into equidistant alternate reflecting and non-reflecting zones. Each of the annuli has an even number of zones. The disc is rotatably mounted for rotation about its axis. Each of the annuli may be subdivided into equidistant alternate transparent and absorbent zones. $n$ annuli are provided on the surface of the disc. The annuli are of equal radial width. The $i^{th}$ annulus has a number $k_i$ of zones defined as $$k_i = k_{i-1} + 2$$

wherein $i = 2, \ldots, n$. The disc rotates at a frequency $\nu_o$. $k_1$ is approximately equal to $2n$. The average diameters $k_i$ of the annuli are related to the radii $r_i$ thereof by the relation $$r_1 : r_2 : \ldots r_{n-1} : r_n = k_1 : k_2 : \ldots k_{n-1} : k_n .$$

The chopper of the modulator means may comprise a pair of spaced rotatably mounted rollers and an endless band mounted on and extending between the rollers for movement therebetween. The band is divided into a plurality of longitudinally extending strips each of which is subdivided into equidistant alternate reflecting and non-reflecting zones. Each of the strips has an even number of zones. Each of the strips of the endless band may be divided into equidistant alternate transparent and absorbent zones. The strips of the endless band are equal in width. $n$ strips are provided on the endless band. The $i^{th}$ strip of the endless band has a number $k_i$ of zones which is defined as a whole number multiple of $$k_{i-1} - 2$$

wherein $i = 2, \ldots, n$. $k_1$ is approximately equal to $2n$.

The apparatus may further comprise another chopper. The modulator means projects the specimen section on at least one of the choppers and then on the radiation detector. At least one of the choppers is penetrated by the radiation impinging upon the radiation detector. The radiation detector may be a semiconductor body having a photoelectric effect. The radiation detector may be a semiconductor body having a photothermomagnetic effect. The radiation detector may be a semiconductor photoresistor. The radiation detector may be a barrier layer photoelement having a barrier layer extending parallel to the irradiated surface. The photoelement comprises a III–V or II–VI compound.

The radiation detector is a semiconductor body of indium antimonide. The semiconductor body has inclusions of good electrically conductive nickel antimony embedded therein. The inclusions are needle-shaped and are aligned substantially parallel to each other and substantially parallel to the direction of the radiation and substantially perpendicular to the direction of the magnetic field and to the direction of flow of applied electric current.

A gallium arsenide luminescence diode is coupled between the amplifier and the demodulator for converting the detector voltage into an optical signal. A plurality n of light conductors are provided. Each of a plurality of photoresistors is connected to a corresponding one of the demodulators. Each of the light conductors extends from the luminescence diode to a corresponding one of the photoresistors for conducting light from the diode to each of the photoresistors.

Means is provided for illuminating the chopper with constant light whereby the chopper provides n optical signals each of which is modulated on a carrier frequency. Light conducting means is coupled between the chopper and the demodulators for supplying each of the optical signals to a corresponding one of the demodulators as a phase signal. The light conducting means includes a plurality of phototransistors each connected to a corresponding one of the demodulators and a plurality of light conductors each extending from the chopper to a corresponding one of the phototransistors.

A cathode ray oscillograph tube may be coupled to the storage means. The tube has a light spot controllable in brightness in accordance with the image point pulses. Scanning means may be provided for scanning a plurality of rectilinear sections at a frequency $\nu_B$ and means may be provided for synchronizing the image deflection in the oscillograph tube with the frequency.

In accordance with the invention, a method for the image conversion of infrared radiation wherein at least one specimen section is projected on the surface of a radiation detector to produce a control signal in accordance with radiation impinging on the detector, comprises the steps of directing radiation from the specimen section to the surface of the radiation detector in a manner whereby the surface is marked with various image points in a predetermined geometrical arrangement at various carrier frequencies, adding at the radiation detector all the image intensity pulses impressed upon the various carrier frequencies to produce a signal which is the sum thereof, separating the image point pulses in accordance with their carrier frequencies, storing the separated image point pulses, and scanning the stored image point pulses in accordance with the sequence of the marked image point thereby providing a suitable control signal.

The marked image points are arranged in a scanning type arrangement. The various sections of the specimen are projected from the radiation detector in sequence. The various sections of the specimen are projected from the radiation detector in sequence with the marked image points adjacently arranged rectilinearly on the sections. In $n$ marked image points the carrier frequency $\nu_i$ of the $i^{th}$ image point is defined as $$\nu_i = \nu_1 + (i-1)\nu_o$$

wherein $\nu_1 = m\nu_o$; $i = 1, \ldots n$; $\nu_o$ is an arbitrary frequency and $n$ is a whole number. $m$ is approximately equal to $n$. $\nu_o$ is between appeoximately 10 and 1000 Hertz.

The signals provided by the radiation detector are amplified. The image point pulses are simultaneously separated.

In order that the invention may be readily carried into effect, it will now be described with reference to the accompanying drawings, wherein.

In the FIGS., the same components are identified by the same reference numerals.

Figure 1:
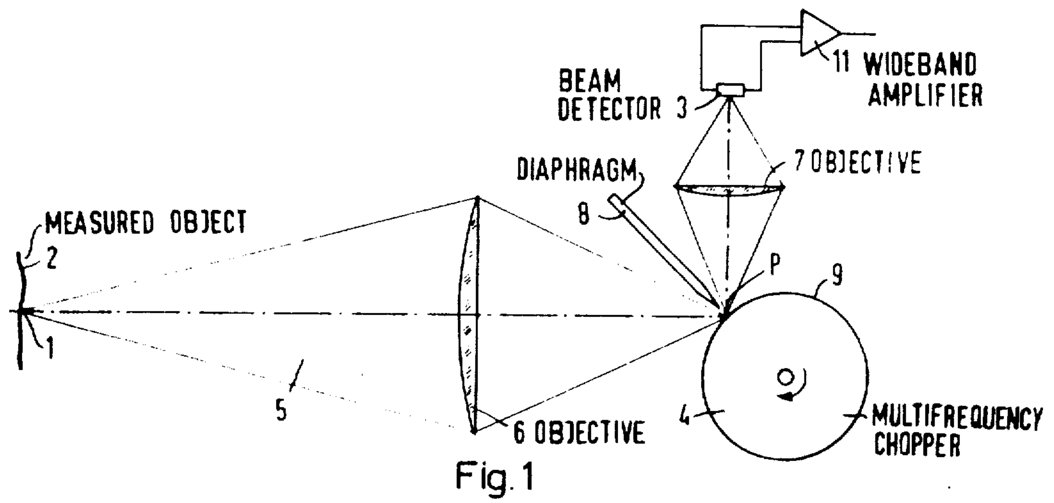
FIG. 1 is a schematic diagram of an embodiment of the apparatus of the invention for the image conversion of infrared radiation.

FIG. 1 illustrates how the thermoactinic radiation of a specimen section 1 of a measured object 2 is projected upon a line, beam or radiation detector 3 and is modulated by a multifrequency chopper 4 at a plurality of carrier frequencies. In FIG. 1, as in all the other embodiments, a rectilinear section or specimen line is selected which is positioned in the Figure perpendicularly to the plane of the illustration. Accordingly, the radiation detector 3 is also rectilinear. The infrared radiation 5 of the specimen section 1 is projected via an objective 6 on the surface 9 of a cylinder 4 of the multifrequency chopper.

The image P of the rectilinear specimen section 1 is projected on the cylinder 4 parallel to the axis of said cylinder. Another objective 7 projects the line of the cylinder 4 on the rectilinear detector 3. A slot diaphragm 8 is fixedly positioned in a manner whereby it determines the width of the specimen line or section 1 and prevents the radiation of the measured object 2 from impinging directly upon the rectilinear detector 3. In order to adjust the surface of the line detector to be illuminated to the surface 9 of the cylinder 4, the objective or optical system 7 may be designed as an anamorphosis having focal widths which depend upon the azimuth. The surface 9 of the cylinder 4, which is the chopper surface, is divided into component cylinders, each of which is subdivided into reflecting and non-reflecting zones or regions as hereinafter described. The multifrequency chopper 4 comprises a cylinder which rotates about its axis 10 (FIG. 2) at a frequency $\nu_o$ and modulates the thermoactinic radiation of the specimen section 1 on adjacent bundles of the radiation, at variable carrier frequencies. Thus, in the rectilinear radiation detector 3, the radiation impinging upon various adjacent surface elements of the total detector surface is marked at various chopper frequencies. The projected specimen is divided into image points with the assistance of such marks.

When a radiation detector is utilized, whose various surface elements corresponding to image points produce voltages which may be added to each other, a mixed signal is provided as a detector output voltage which additively comprises an image point intensity. A radiation detector having these characteristics may comprise a semiconductor body having photoelectromagnetic effect, or a PEM detector, or a semiconductor body having photothermomagnetic effect, or an OEN detector. Such radiation detectors are described in German Patent No. 1,214,807, which is a patent of addition to application No. P 16 14 570.3 (VPA 67/1379), and in "Solid State Electronics", Vol. 11, 1968, pages 979–981.

A photobolometer may also function as a radiation detector, as disclosed, for example, in German application No. P 16 14 535.0 (VPA 67/1298 and VPA 68/1725). Such radiation detectors produce a signal in the form of a voltage provided in parallel with the surface of the receiver. The surface elements, which therefore function as detector elements, are connected in series. More particularly, in order to provide a surface projection of the entire specimen or object 2 on the rectilinear radiation detector 3, a barrier layer photoelement may function as a radiation detector. The barrier layer extends parallel to the irradiated surface. A preferred material for a PEM detector, an OEN detector, or a photobolometer is indium antimonide, particularly indium antimonide including inclusions of good electrical conductivity, such as nickel antimonide or NiSb. The inclusions of good electrical conductivity are of needle-like configuration and are aligned substantially in parallel with each other and in parallel with the direction of the radiation to be registered, and perpendicular to the direction of the magnetic field or the direction of flow of the current.

The OEN detector in particular has a single time constant in the order of magnitude of 100 $\mu$s. and a sensitivity range which extends beyond the sensitivity limit of 7 $\mu$ of the indium antimonide. An infrared image converter including such a radiation detector, which, according to the invention, operates with a line detector and a one-dimensional beam deflection, may be operated without cooling, whereby an image sequence frequency of 16 Hertz may be obtained.

The radiation detector 3 of the embodiment of FIG. 1 has an output connected to the input of a wideband amplifier 11. The bandwidth of the amplifier 11 extends at least from $$\nu_1 = n\nu_o \text{ to } \nu_n = 2\nu_1$$

The mixed signal voltage obtained via the radiation detector 3 is amplified in a channel in the wideband amplifier 11. The subsequent separation of the image point pulses by frequency analysis is hereinafter described.

Figure 2:
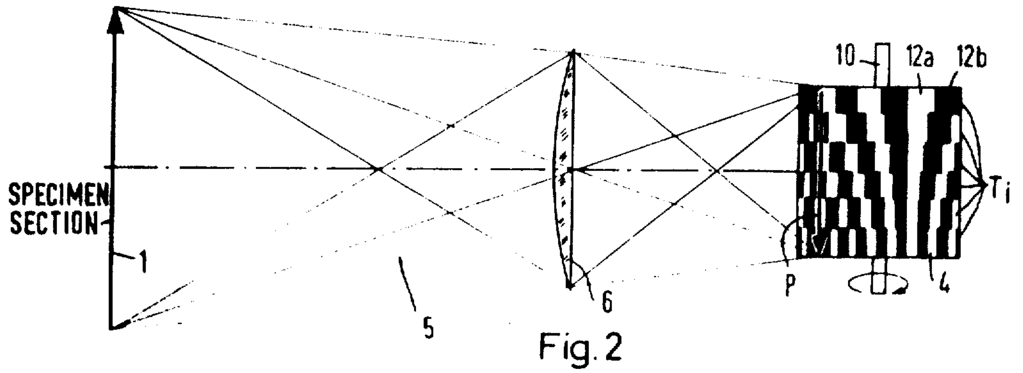
FIG. 2 is a schematic diagram of the apparatus of FIG. 1 in a plane perpendicular to that of the plane of the illustration of FIG. 1.
Figure 3:
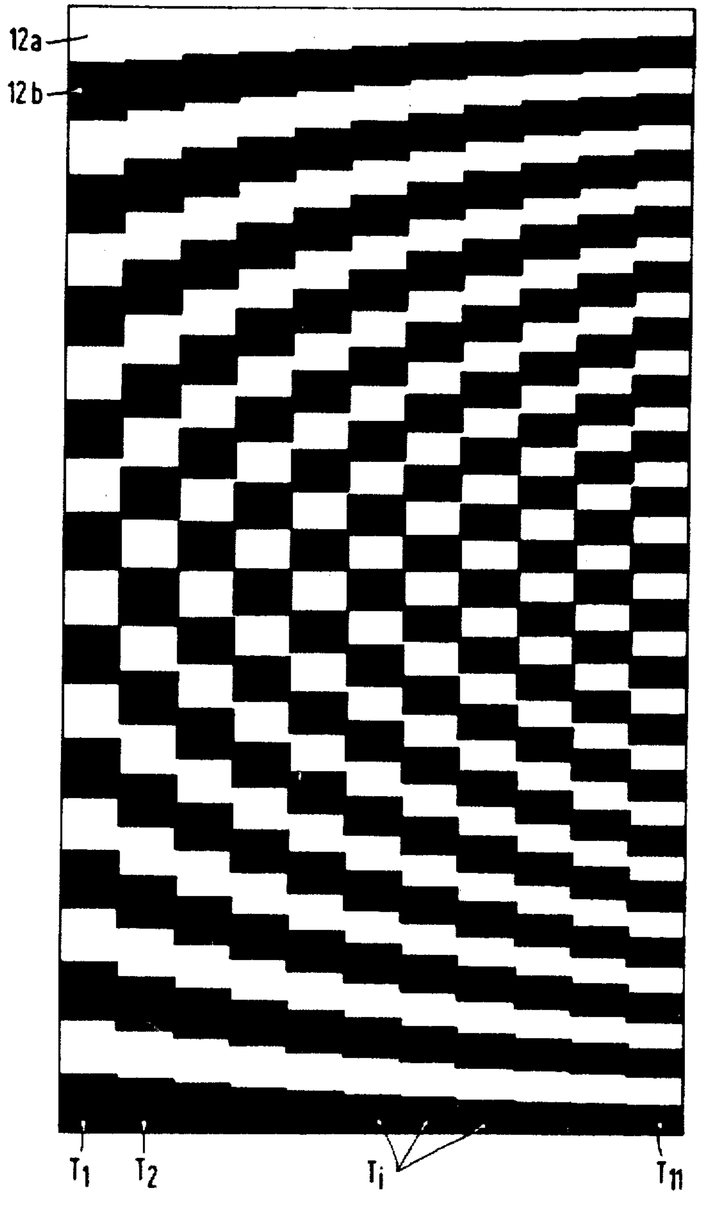
FIG. 3 is a developed surface of the cylinder 4 of FIGS. 1 and 2.

In the view of FIG. 2, the slot diaphragm 8, the objective or optical system 7 and the radiation detector 3 are omitted. FIG. 2 especially illustrates the division of the surface 9 of the cylinder 4 into the cylindrical components $T_i$ (FIG. 3). The individual cylinders $T_1, T_2, \ldots T_i, \ldots$ (FIG. 3) are each subdivided into alternating reflecting and non-reflecting zones or regions 12*a* and 12*b* (FIGS. 2 and 3). Each of the cylindrical components $T_i$ modulates a radiation bunch of the impinging infrared radiation 5 on a carrier frequency $\nu_i$.

FIG. 3 is a developed view of the surface 9 of the cylinder 4 of FIG. 1. Eleven image points are provided for each longitudinal line. The cylinder 4 is therefore divided into eleven component cylinders or cylindrical components $T_1$ to $T_{11}$, each having an equal altitude or longitudinal length. Each of the component cylinders $T_1$ to $T_{11}$ defines a longitudinal strip of the developed surface 9. Each cylindrical component or component cylinder $T_i$ is alternately divided into $k_i$ equidistant reflecting or non-reflecting zones or regions 12*a* and 12*b*. In the example of FIG. 3, $i = 1 \ldots 11$.

If a cylinder 4 having a surface as indicated in FIG. 3 is rotated about its axis at a frequency $\nu_0$, the reflecting radiation is modulated from the cylindrical component $T_i$, having $k_i$ zones, at a chopper frequency $$\nu_i = k_i/2\ \nu_o$$

When all the component cylinders are differently subdivided, so that $k_i \neq k_j$, where $i \neq j$ and $i, j = 1, \ldots n$, the beam of the projected specimen section 1 which reflects along the line of the surface 9, is separated into 11 adjacent radiation bunches which are modulated at various frequencies and which mark the eleven image points on the detector 3.

The number $k_i$ of the zones 12 is planned, but must always be even. To provide a favorable distribution, that is, the best possible uniformity, for the frequency band spacing of the image point frequencies, it is preferred to select the smallest value $k_i$ of the order of magnitude, or exactly equal to, 2*n* of twice the number of image points. The determination or adjustment of $k_i = k_{i-i}+2$, that is, the determination that each subsequent cylindrical component contains two more zones than the previous one, produces for the relative band spacing of adjacent image point frequencies $$\left(\frac{\Delta v}{v}\right)_i = \frac{v_{i+1}-v_i}{v_i} = \frac{(k_{i+1}-k_i)v_o}{k_i v_o} = \frac{2}{k_i}$$

If $k_i = 2n$, then $k_n = 4n-2$, and the band spacing increases from the most closely divided cylindrical component $T_{11}$, which corresponds to the highest chopper frequency, to the most widely divided cylindrical component $T_1$, which corresponds to the lowest chopper frequency, by a factor $$\frac{(\Delta v/v)_1}{(\Delta v/v)n} = \frac{2(2n-1)}{2n} = 2 - \frac{1}{n} \approx 2$$

In FIG. 3, $k_1 = 10$ and $k_{11} = 20$. As hereinbefore mentioned, the chopper cylinder 4 reduces a line dissolution into eleven image points.

Figure 4:
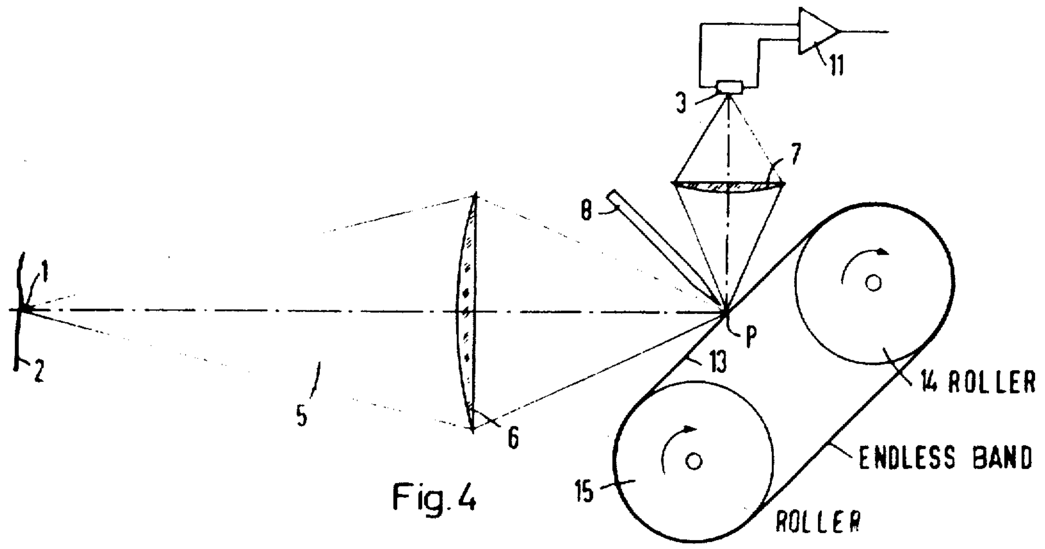
FIG. 4 is a schematic diagram of another embodiment of the apparatus of the invention for the image conversion of infrared radiation.

In FIG. 4, the multifrequency chopper comprises an endless band 13 clamped between two rotatably mounted rollers 14 and 15. The surface of the endless band 13 is divided into longitudinally extending strips of equal width. Each of the longitudinally extending strips is divided into equidistant alternately reflecting and non-reflecting regions or zones. The surface of the endless band 13 is divided in the same manner as illustrated in FIG. 3. However, a plurality of zone groups, illustrated in FIG. 3, may be divided in sequence in a strip portion, so that the number of zones of each longitudinally extending strip may also define a whole number multiple of the corresponding number $k_i$ of FIG. 3.

The zones 12 of the band 13 may also be either reflecting and non-reflecting or transparent and absorbent. In the embodiment of FIG. 4, the zones reflect radiation at the multifrequency chopper. Modulation may also readily occur during the irradiation of the endless band 13.

The endless band 13 assists in eliminating a shortcoming of the multifrequency chopper of cylindrical configuration, as shown in FIGS. 1 and 2. More particularly, in the cylindrical multifrequency chopper, the subdivision must be provided on a curved surface, although such surface may be developed. Special features must be provided for the image P of the specimen section 1 on the line detector 3. The shortcoming is eliminated by a planar design of the endless band 13 as well as by utilizing a chopper of the embodiment of a disc, as shown in FIG. 5.

Figure 5:
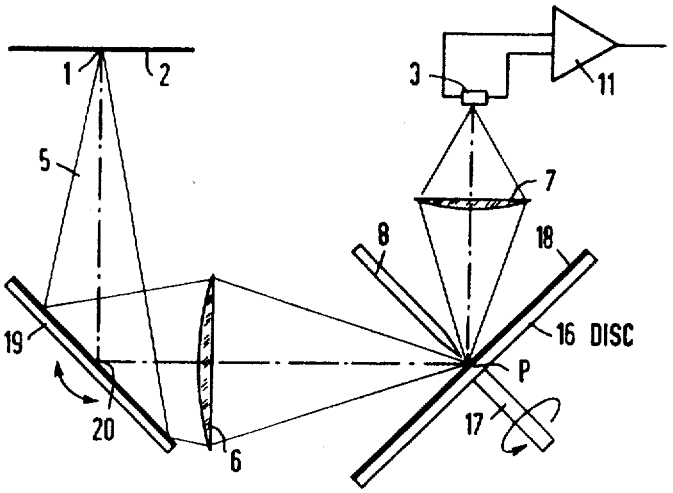
FIG. 5 is a schematic diagram of another embodiment of the apparatus of the invention for the image conversion of infrared radiation.

In FIG. 5, the multifrequency chopper is a circular disc 16 rotatably mounted for rotation about its axis 17 at a frequency $\nu_0$. The disc 16 has a surface 18 which is divided into *n* sequential annuli or rings having equal radial dimensions. That is, the difference between the larger and smaller radius of each ring is equal to that of the other rings. Each of the rings is divided into a variable number of zones or regions.

The specimen line 1, projected on a stationary fixed radius line P (FIG. 5) is broken up into image point components, modulated at variable frequencies, during reflection or, as in the present example, during the irradiation of the disc 16 by suitable apparatus. The thus modulated radiation is again supplied to the radiation, line or beam detector 3 via the objective or optical system 7.

Figure 6:
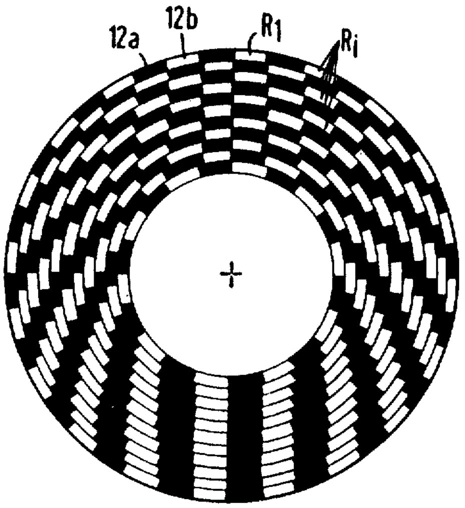
FIG. 6 is a view of the surface 18 of the disc 16 of FIG. 5.

The subdivision of the disc 16 into annular rings $R_1$ to $R_n$ is shown in FIG. 6. Each ring $R_i$ has a plurality of zones or regions 12*a* and 12*b* of a number determined as indicated in the description of FIG. 3. The zones 12 of each ring $R_i$ may be provided in approximately the same dimensions if the median radii $r_i$ of the individual rings are related to each other in the same manner as the number $k_i$ of the zones of said rings. That is, if $$r_1 : r_2 : \ldots : r_{n-1} : r_n = k_1 : k_2 : \ldots : k_{n-1} : k_n$$

The embodiment of FIG. 5 includes an inclined mirror or reflector 19 which may be utilized for the rectilinear scanning of the measured object 2. The reflector rotates about an axis 20 at the sweep frequency $\nu_B$. The axis 20 is perpendicular to the plane of illustration of FIG. 5. The reflector 19 sequentially projects adjacent specimen sections or lines 1 of the measured object 2 on the radius line P of the disc 16.

Multifrequency choppers of the aforedescribed type are easy to produce. The disc-shaped and endless band-shaped surfaces may be produced in accordance with a pattern drawn on an enlarged scale, and with great accuracy, with the assistance of photoetching, in accordance with a method ordinarily utilized in the semiconductor art. A modification of the cutting device utilized to produce phonographic records may also be utilized, on occasion.

Figure 7:
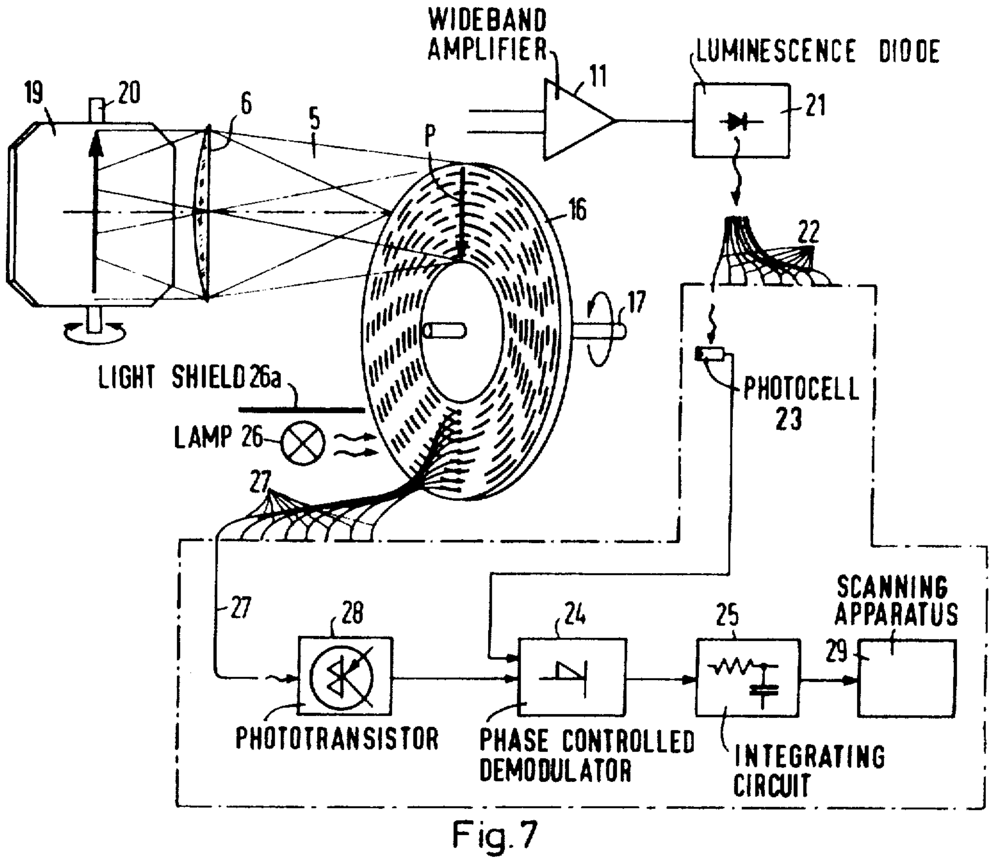
FIG. 7 is a view of the apparatus of FIG. 5, taken in a plane perpendicular to the plane of illustration of FIG. 5.

FIG. 7 is a view taken in a plane at right angles to the plane of illustration of FIG. 5. The radiation detector 3 and the optical system 7 are not shown in FIG. 7. The zones of the disc 16 are illustrated in FIG. 7. FIG. 7 includes a block diagram of the circuit utilized with the embodiment of FIG. 5. The mixed signal voltage produced by the radiation detector 3 is amplified by the wideband amplifier 11. At the output of the amplifier 11, the mixed signal voltage is split in accordance with the $n$ carrier frequencies in order to receive the image point pulses for controlling the monitor or other equipment to be controlled by the output signal of said amplifier. It is important to utilize the information of all the channels simultaneously, and during the entire measuring period of the specimen section 1, in order to provide an optimum signal to noise ratio.

As shown in FIG. 7, the amplified mixed signal is converted into an optical signal by applying it to a gallium arsenide luminescence diode 21. The amplified mixed signal voltage is utilized to control the brightness or intensity of the luminescence diode 21. The light emitted by the luminescence diode 21 irradiates a plurality of n photocells 23, of which only one is illustrated in FIG. 7 to maintain the clarity of illustration. The photocells 23 are irradiated via a plurality of $n$ light conducting fibers 22. Each photocell 23 then delivers the same mixed signal, wherefrom only the signal voltage relating to the corresponding channel is selected.

The signal voltage relating to the corresponding channel is selected by a phase-controlled demodulator 24. The phase-controlled demodulator 24 is connected to the output of the corresponding photocell. The signal voltage produced by the phase-controlled demodulator 24 is applied to an integrating circuit 25 which functions as a storer or accumulator. Although there are $n$ photocells 23, $n$ phase-controlled demodulators 24 and n integrating circuits 25, only a single photocell 23, a single phase-controlled demodulator 24 and a single integrating circuit 25 are shown in FIG. 7 in order to maintain the clarity of illustration.

Each phase-controlled demodulator is controlled in its switching cycle by a phase signal. The phase signal is provided by the multifrequency chopper 16 via an illuminating lamp 26. The illuminating lamp 26 emits constant light and illuminates a radial line of the disc 16. A diaphragm 26*a* shields the rest of the equipment from the light produced by the lamp 26. Each annulus or ring $R_i$, wherein $i = 1, \ldots, n$, supplies from the radial line to a phototransistor 28 a phase signal having a frequency $v_i$. Each phase signal is supplied to a corresponding one of a plurality of phototransistors via a corresponding one of a plurality of light conductors 27. Each phototransistor functions as a switching transistor and produces an output signal which is supplied to a corresponding one of the phase-controlled demodulators 24. Although a plurality of light conductors 27 and a plurality of phototransistors 28 are utilized in the embodiment of FIG. 7, only one phototransistor 28 and one extended light conductor 27 are shown in order to maintain the clarity of illustration.

During the entire irradiation period of the radiation detector 3, each of the $n$ integrating circuits 25, and more particularly their load capacitors, are varied, via the corresponding one of the $n$ demodulators 24 in accordance with the information associated with the appertaining image point.

The entire infrared image is then recorded via successive scanning of the information stored in the n integrating circuits 25. This is accomplished via output leads 29 from the integrating circuits 25 and via brightness control, for example, in a cathode ray oscillograph tube, of the image signal during synchronous deflection of the image point on the screen. The image deflection of the oscillograph tube must be controlled in synchronism with the image sweep frequency $v_B$ of the reflector 19. This results in an indication of the infrared image of the specimen as a visible gray tone image on the screen of the cathode ray tube. The electronic switching components necessary for scanning the integrating circuits or storage circuits 25 and for controlling the cathode ray oscillograph tube are well known and therefore need not be separately described herein. Neither the oscillograph tube nor the switching circuits are illustrated in FIG. 7.

It should be pointed out that isotherms may be drawn on the screen of the cathode ray tube, as in known infrared image conversion apparatus, by scanning of a preselected intensity interval of the irradiation.

In the embodiment of my invention hereinbefore disclosed, a rectilinear specimen section is projected upon a chopper and thence upon a rectilinear radiation or beam detector. An expansion is feasible upon a surface specimen section. To accomplish this, the image points of the specimen section are marked not only in rectilinear adjacent surface elements, at variable carrier frequencies, but a mosaic type surface marking may be utilized in the form of scanning, for example. Such marking may be accomplished by two choppers, preferably of the endless band type, one of which is illustrated in the embodiment of FIG. 4.

The bands of each of the two choppers may be crossed, for example, in superimposed position and may be irradiated by the radiation or beam of the specimen. When both bands are positioned perpendicularly on each other, and if both bands are moved on their corresponding rollers, a scanning type modulation of the beam and a scanning-like arrangement of the surface elements, marked at chopper frequencies, are provided on a surface radiation detector.

A particularly suitable surface radiation detector comprises a barrier layer photocell. The mixed signal produced by the radiation detector may be processed in the aforedescribed manner. The number of demodulators which must be utilized corresponds to the number of image points of the raster comprising the marked surface elements. The electronic output is thus considerably higher than in a device with a rectilinear specimen section. Such a device is therefore preferred only in very special instances, over the disclosed embodiments.

While the invention has been described by means of specific examples and in specific embodiments, I do not wish to be limited thereto, for obvious modifications will occur to those skilled in the art without departing from the spirit and scope of the invention.

I claim:

1. Apparatus for the image conversion of infrared radiation, said apparatus comprising
   - a radiation detector having a surface and producing a control signal in accordance with radiation impinging thereon;
   - projecting means for projecting at least one specimen section on the surface of said radiation detector, said projecting means comprising optically effective modulator means for directing radiation from said specimen section to the surface of said radiation detector in a manner whereby said surface is marked with various image points in a predetermined geometrical arrangement at various carrier frequencies, said radiation detector producing a signal which is the sum of all the image intensity pulses impressed upon the various carrier frequencies;
   - separating means coupled to said radiation detector for separating the image point pulses in accordance with their carrier frequencies;
   - storage means coupled to said separating means for individually storing the separated image point pulses; and
   - scanning means coupled to said storage means for scanning the stored image point pulses in accordance with the sequence of the marked image point in order to provide a suitable control signal.

2. Apparatus as claimed in claim 1, wherein the marked image points are in a scanning type arrangement.

3. Apparatus as claimed in claim 1, wherein the radiation detector projects in sequence the various sections of the specimen.

4. Apparatus as claimed in claim 1, wherein the radiation detector projects in sequence the various sections of the specimen, the marked image points being adjacently arranged rectilinearly on said sections.

5. Apparatus as claimed in claim 1, wherein in n marked image points, the carrier frequency $\nu_i$ of the $i^{th}$ image point is defined as $$\nu_i = \nu_1 + (i-1)\,\nu_o$$

wherein $\nu_1 = m\nu_o$; $i = 1, \ldots n$; $\nu_o$ is an arbitrary frequency and m is a whole number.

6. Apparatus as claimed in claim 1, further comprising a wideband amplifier coupling said radiation detector to said separating means.

7. Apparatus as claimed in claim 1, wherein said separating means simultaneously separates the image point pulses.

8. Apparatus as claimed in claim 1, wherein said separating means comprises a plurality of phase controlled demodulators equal in number to the number n of the marked image points.

9. Apparatus for the image conversion of infrared radiation, said apparatus comprising a radiation detector having a surface;

optically effective modulator means for directing radiation from a specimen section to the surface of said radiation detector in a manner whereby the surface of said radiation detector is marked with various image points in a predetermined geometrical arrangement at various carrier frequencies, said radiation detector having surface elements for producing addable voltages at said surface elements corresponding to the marked image points, said modulator means comprising a multifrequency chopper for producing the carrier frequencies;

a wideband amplifier coupled to said radiation detector;

a plurality of phase controlled demodulators equal in number to the number n of the marked image points coupled to said wideband amplifier for separating the image point pulses in accordance with their carrier frequencies; and a plurality of storage means each connected to a corresponding one of said demodulators for individually storing the separated image point pulses.

10. Apparatus as claimed in claim 5, wherein $m$ is approximately equal to $n$.

11. Apparatus as claimed in claim 5, wherein $\nu_o$ is between approximately 10 and 1000 Hertz.

12. Apparatus as claimed in claim 8, wherein said demodulators are controlled by phase signals provided by said modulator means.

13. Apparatus as claimed in claim 8, further comprising optical means coupled between said modulator means and said separating means for optically splitting the signal produced by said radiation detector into $n$ signals and for supplying each of said signals to a corresponding one of said demodulators.

14. Apparatus as claimed in claim 9, wherein the chopper of said modulator means comprises a cylinder rotatably mounted for rotation about its axis, said cylinder having a cylindrical surface subdivided into a plurality of coaxial next-adjacent component cylinders, each of the component cylinders being further divided into equidistant alternate reflecting and non-reflecting zones, each of said component cylinders having an even number of zones.

15. Apparatus as claimed in claim 9, wherein the chopper of said modulator means comprises a disc having a surface divided into a plurality of concentric annuli, each of said annuli being subdivided into equidistant alternate reflecting and non-reflecting zones, each of said annuli having an even number of zones.

16. Apparatus as claimed in claim 9, further comprising another chopper.

17. Apparatus as claimed in claim 9, further comprising another chopper, and wherein said modulator means projects the specimen section on at least one of the choppers and then on said radiation detector.

18. Apparatus as claimed in claim 9, further comprising another chopper, and wherein at least one of the choppers is penetrated by the radiation impinging upon said radiation detector.

19. Apparatus as claimed in claim 9, wherein said radiation detector is a semiconductor body having a photoelectric effect.

20. Apparatus as claimed in claim 9, wherein said radiation detector is a semiconductor body having a photothermomagnetic effect.

21. Apparatus as claimed in claim 9, wherein said radiation detector is a semiconductor photoresistor.

22. Apparatus as claimed in claim 9, wherein said radiation detector is a barrier layer photoelement having a barrier layer extending parallel to the irradiated surface.

23. Apparatus as claimed in claim 9, wherein said radiation detector is a semiconductor body of indium antimonide, said semiconductor body having inclusions of good electrically conductive nickel antimony embedded therein.

24. Apparatus as claimed in claim 9, further comprising a gallium arsenide luminescence diode coupled between said amplifier and said demodulators for converting the detector voltage into an optical signal.

25. Apparatus as claimed in claim 9, further comprising means for illuminating the chopper with constant light whereby said chopper provides n optical signals each of which is modulated on a carrier frequency and light conducting means coupled between said chopper and said demodulators for supplying each of said optical signals to a corresponding one of said demodulators as a phase signal.

26. Apparatus as claimed in claim 9, further comprising a cathode ray oscillograph tube coupled to said storage means and having a light spot controllable in brightness in accordance with said image point pulses.

27. Apparatus as claimed in claim 9, wherein the chopper of said modulator means comprises a pair of spaced rotatably mounted rollers and an endless band mounted on and extending between said rollers for movement therebetween, said band being divided into a plurality of longitudinally extending strips each of which is subdivided into equidistant alternate reflecting and non-reflecting zones, each of said strips having an even number of zones.

28. Apparatus as claimed in claim 14, wherein the component cylinders are of equal lateral width.

29. Apparatus as claimed in claim 14, wherein the $i^{th}$ component cylinder has a number $k_i$ of zones defined as $$k_i = k_{i-1} + 2$$

wherein $i = 2, \ldots, n$.

30. Apparatus as claimed in claim 14, wherein said cylinder rotates at a frequency $\nu_o$.

31. Apparatus as claimed in claim 15, wherein said disc is rotatably mounted for rotation about its axis and each of said annuli is subdivided into equidistant alternate transparent and absorbent zones.

32. Apparatus as claimed in claim 15, wherein $n$ annuli are provided on the surface of said disc.

33. Apparatus as claimed in claim 15, wherein the annuli are of equal radial width.

34. Apparatus as claimed in claim 15, wherein the $i^{the}$ annulus has a number $k_i$ of zones defined as $$k_i = k_{i-1} + 2$$

wherein $i = 2, \ldots, n$.

35. Apparatus as claimed in claim 22, wherein said photoelement comprises a III–V compound.

36. Apparatus as claimed in claim 23, wherein the inclusions are needle-shaped and are aligned substantially parallel to each other and substantially parallel to the direction of the radiation and substantially perpendicular to the direction of the magnetic field.

37. Apparatus as claimed in claim 23, wherein the inclusions are needle-shaped and are aligned substantially parallel to each other and substantially parallel to the direction of the radiation and substantially perpendicular to the direction of flow of applied electric current.

38. Apparatus as claimed in claim 24, further comprising a plurality n of light conductors and a plurality of photoresistors each connected to a corresponding one of said demodulators, each of said light conductors extending from said luminescence diode to a corresponding one of said photoresistors for conducting light from said diode to each of said photoresistors.

39. Apparatus as claimed in claim 25, wherein said light conducting means includes a plurality of phototransistors each connected to a corresponding one of said demodulators and a plurality of light conductors each extending from said chopper to a corresponding one of said phototransistors.

40. Apparatus as claimed in claim 26, further comprising scanning means for scanning a plurality of rectilinear sections at a frequency $\nu_B$ and means for synchronizing the image deflection in said oscillograph tube with said frequency.

41. Apparatus as claimed in claim 27, wherein each of the strips of said endless band is divided into equidistant alternate transparent and absorbent zones.

42. Apparatus as claimed in claim 27, wherein the strips of said endless band are equal in width.

43. Apparatus as claimed in claim 27, wherein $n$ strips are provided on said endless band.

44. Apparatus as claimed in claim 27, wherein the $i^{th}$ strip of said endless band has a number $k_i$ of zones which is defined as a whole number multiple of $$k_{i-1} - 2$$

wherein $i = 2, \ldots, n$.

45. Apparatus as claimed in claim 29, wherein $k_1$ is approximately equal to $2n$.

46. Apparatus as claimed in claim 31, wherein said disc rotates at a frequency $\nu_0$.

47. Apparatus as claimed in claim 34, wherein $k_1$ is approximately equal to $2n$.

48. Apparatus as claimed in claim 34, wherein the average diameters $k_i$ of said annuli are related to the radii $r_i$ thereof by the relation $$r_1:r_2:\ldots r_{n-1}:r_n = k_1:k_2:\ldots k_{n-1}:k_n$$

49. Apparatus as claimed in claim 44, wherein $k_1$ is approximately equal to $2n$.

50. A method for the image conversion of infrared radiation wherein at least one specimen section is projected on the surface of a radiation detector to produce a control signal in accordance with radiation impinging on said detector, said method comprising the steps of directing radiation from the specimen section to the surface of the radiation detector in a manner whereby the surface is marked with various image points in a predetermined geometrical arrangement at various carrier frequencies;

adding at the radiation detector all the image intensity pulses impressed upon the various carrier frequencies to produce a signal which is the sum thereof;

separating the image point pulses in accordance with their carrier frequencies;

storing the separated image point pulses; and scanning the stored image point pulses in accordance with the sequence of the marked image point thereby providing a suitable control signal.

51. A method as claimed in claim 50, wherein the marked image points are arranged in a scanning type arrangement.

52. A method as claimed in claim 50, wherein the various sections of the specimen are projected from the radiation detector in sequence.

53. A method as claimed in claim 50, wherein the various sections of the specimen are projected from the radiation detector in sequence with the marked image points adjacently arranged rectilinearly on the sections.

54. A method as claimed in claim 50, wherein in n marked image points the carrier frequency $\nu_i$ of the $i^{th}$ image point is defined as $$\nu_i = \nu_1 + (i-1)\,\nu_o$$

wherein $\nu_1 = m\nu_o$; $i = 1, \ldots n$; $\nu_o$ is an arbitrary frequency and $m$ is a whole number.

55. A method as claimed in claim 50, further comprising amplifying the signals provided by the radiation detector.

56. A method as claimed in claim 50, wherein the image point pulses are simultaneously separated.

57. A method as claimed in claim 54, wherein m is approximately equal to $n$.

58. A method as claimed in claim 54, wherein $\nu_o$ is between approximately 10 and 1000 Hertz.

59. Apparatus as claimed in claim 22, wherein said photoelement comprises a II–VI compound.

* * * * *